United States Patent [19]

Swanson

[11] 4,354,688

[45] Oct. 19, 1982

[54] HYDRAULIC CIRCUIT FOR A TRACTOR DRAWN IMPLEMENT HAVING REMOTE VARIABLE HEIGHT SELECTOR

[75] Inventor: William C. Swanson, Clarendon Hills, Ill.

[73] Assignee: International Harvester Co., Chicago, Ill.

[21] Appl. No.: 240,037

[22] Filed: Mar. 3, 1981

[51] Int. Cl.³ ............................................. A01B 63/22
[52] U.S. Cl. ................... 280/43.23; 60/484; 91/520; 137/99; 137/101.21; 172/401; 172/413; 172/2
[58] Field of Search ............... 172/2, 4, 400, 401, 172/413; 280/43.13, 43.17, 43.23; 60/384, 484, 702; 91/515, 517, 518, 520; 137/99, 101.21

[56] References Cited

U.S. PATENT DOCUMENTS

| | | | |
|---|---|---|---|
| 3,486,761 | 12/1969 | Fay | 280/43.23 |
| 3,495,610 | 2/1970 | Van Aken | 137/99 |
| 3,733,813 | 5/1973 | Gordon | 60/384 X |
| 3,939,886 | 2/1976 | Tucek | 60/484 X |
| 4,006,752 | 2/1977 | De Vale | 137/101.21 |
| 4,120,233 | 10/1978 | Heiser et al. | 91/518 X |
| 4,221,266 | 9/1980 | Fardal | 172/4 |
| 4,237,688 | 12/1980 | Demmers | 60/484 |

FOREIGN PATENT DOCUMENTS 2827629  1/1979  Fed. Rep. of Germany ........ 60/484

Primary Examiner—Richard T. Stouffer
Attorney, Agent, or Firm—J. W. Gaines; F. D. Au Buchon

[57] ABSTRACT

An implement having a rotary flow divider controlling fluid to and from at least two independent hydraulic rams for raising and lowering the implement in a level manner. A counter monitors the revolutions of the flow divider and actuates an electric circuit which controls solenoid valves to stop the implement at the proper height. A cab mounted adjustable count selector is provided to adjust the desired height of the implement.

5 Claims, 2 Drawing Figures

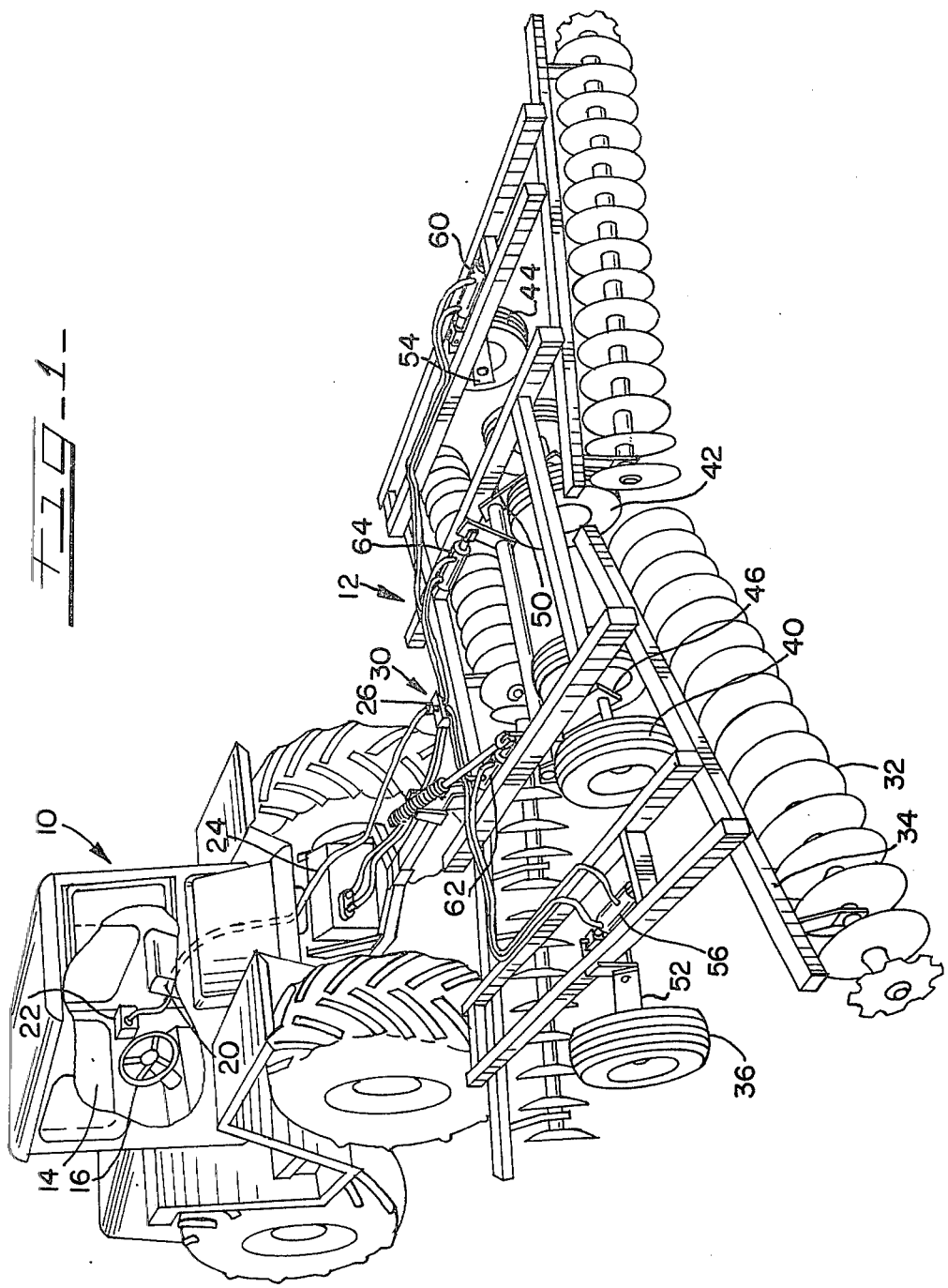

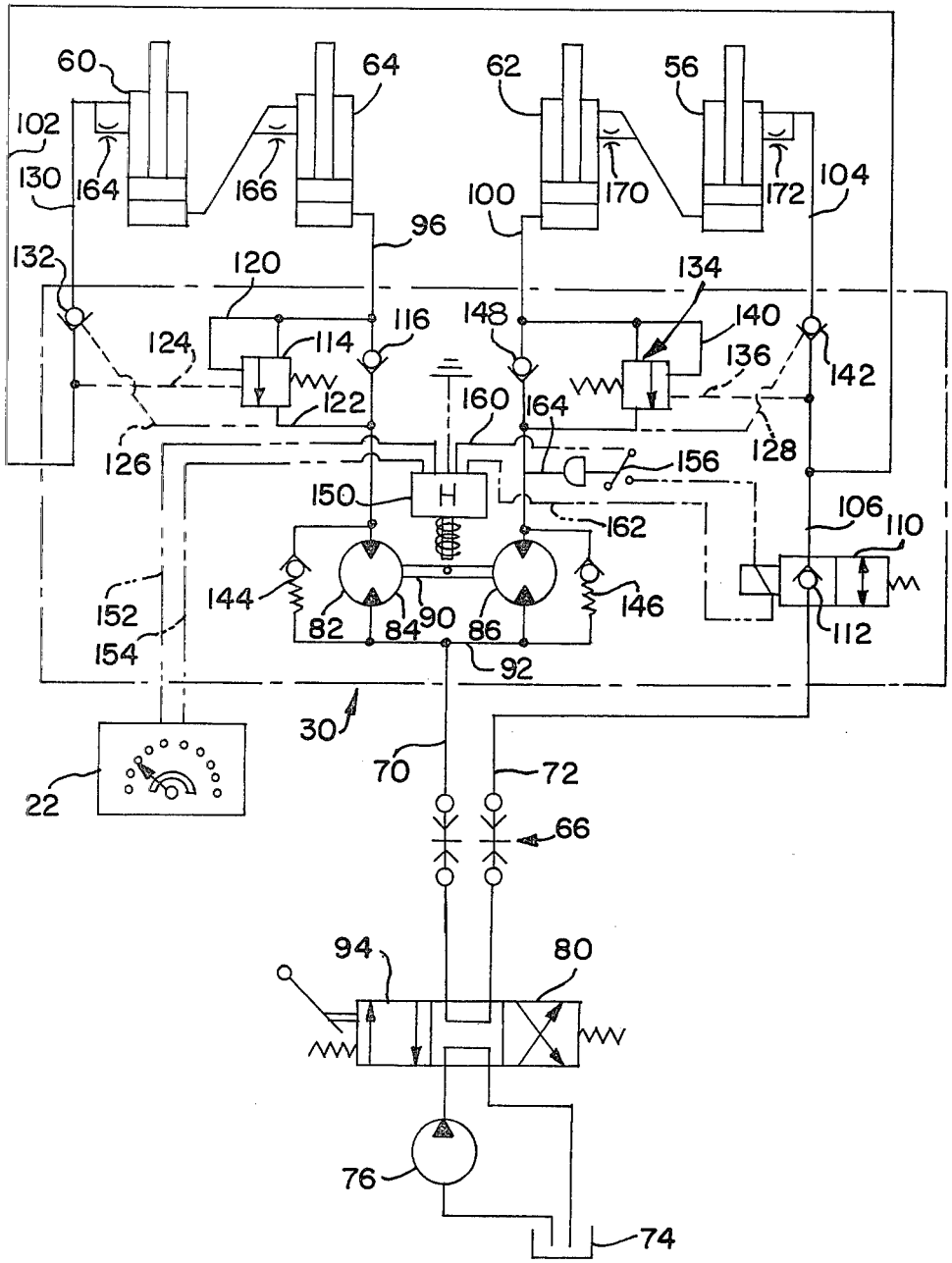
FIG_2

HYDRAULIC CIRCUIT FOR A TRACTOR DRAWN IMPLEMENT HAVING REMOTE VARIABLE HEIGHT SELECTOR

BACKGROUND AND SUMMARY OF THE INVENTION

This invention relates to a hydraulic system for an agricultural implement, e.g. a disk harrow and more particularly to such a system which will automatically control the elevation of the farm implement.

The operation of an agricultural implement, in a specific embodiment a large trail behind type, in the field requires the constant attention of the operator of the host tractor pulling the implement. The direction and speed of the tractor must be controlled carefully for maximum efficiency. For instance, when the tractor operator is tilling a field using a disk harrow the elevation and penetration of the cultivator disks has to be set within an operative range to give adequate tillage performance and to minimize the draft load on the host tractor. Oftentimes as the implement is dragged across the field varying soil conditions are encountered requiring adjustment of the cultivator disks to assure optimum performance. Adjustment, for instance, of the elevation of a disk harrow is best accomplished from inside the operator's cab on the tractor vehicle. Furthermore, when the tractor and its attendant implement get to the headland of the field the reversing of the direction of the tractor places a large burden on the operator, as the operator must now turn the vehicle while raising and lowering the trail behind implement. This operation must be performed quickly and with a high degree of precision. After the tractor vehicle and the implement have been turned around and are heading back down the field the operator must now set the optimum working height of the trail behind implement. This is most easily accomplished from inside the cab as it would prevent the need for the operator to stop the tractor, dismount from the tractor and adjust the implement.

It is known in the prior art to provide automatic depth control for a trail behind implement. It is also taught in U.S. patent application Ser. No. 156,896, now U.S. Pat. No. 4,337,959, entitled "Self Leveling and Height Control Hydraulic System", assigned to the same assignee as this invention, to utilize a rotary flow divider in maintaining disk harrow position control. The contribution that the instant invention makes to the prior art is that a trail behind implement, in this case a disk harrow, utilizes a rotary flow divider for self-leveling and height control and also incorporates an electrical sensing circuit for sensing the position of the implement and communicating this information to the tractor vehicle operator in the operator's work station. Furthermore, the operator's work station incorporates a manual control element for adjusting the height of the trail behind implement relative to the ground plane.

It is, therefore, an object of this invention to provide an electrical control system for cooperation with a hydraulic system of an implement which will be self-leveling and will provide automatic height control.

It is another object to provide a hydraulic system which is capable of performing certain operations on the trail behind implement automatically without the attention of, or only minimum attention of, the vehicle operator in the control of the implement.

Another object of the invention is to use a rotary flow divider to meter fluid flow to each of a plurality of hydraulic cylinders used in coordinating the elevation of a trail behind working implement. Another object of the invention is to provide an interface between the rotary flow divider and the operator's work station to enable the operator to control the height and self-leveling feature of the trail behind implement controlled by the rotary flow divider.

These and other objects of the instant invention, and many of the attendant advantages thereof, will become more readily apparent upon a careful perusal of the following description when considered in light of the accompanying drawings wherein:

FIG. 1 is a representative embodiment of the environment of the invention; and

FIG. 2 is a combined electrical schematic and hydraulic flow diagram of the invention.

DETAILED DESCRIPTION OF THE INVENTION

FIG. 1 presents a tractor vehicle generally 10 to which a trail behind implement such as the disk harrow generally 12 is hitched to be trailed behind the tractor vehicle. The operator's work station 14 of the tractor includes a steering wheel 16, the seat 20, and a housing 22 containing the adjustable count selector. Electrical conduit 24 is connected between the adjustable count selector 22 and a revolution count generator 26 incorporated into a rotary flow divider generally 30.

The disk harrow gangs such as 32 are supported on frame members such as 34 which are carried on ground engaging wheels such as 36, 40, 42 and 44. Wheels 40 and 42 are representative of two wheel sets on a common axle carried on respective left inboard bell crank 46 and right inboard bell crank 50 to raise and be lowered simultaneously. Outboard wheels 36 and 44 are mounted for rotatable movement on left 52 and right 54 outboard bell cranks respectively.

Left and right outboard cylinders 56 and 60 are connected to respective bell crank levers 52 and 54 such that when the rams of these hydraulic cylinders are extended the wheels attached to the bell crank will be pivoted downwardly causing the frame sections 32 to be raised. Left and right inboard cylinders 62 and 64 are connected to respective bell cranks 46 and 50 to raise, when the piston rods thereof are extended, the center section of the trail behind implement. In the embodiment shown a master/slave hydraulic fluid delivery arrangement is utilized as more clearly shown in FIG. 2.

The hydraulic connection to the tractor as generally shown in FIG. 2 is through a conventional hydraulic coupler indicated generally 66 with which conduits 70 and 72 communicate. The tractor has a conventional hydraulic system which includes at least a reservoir 74, a pump 76 and a directional control valve 80 movable by an operator in the tractor. Movement of the control valve from its central neutral position will selectively connect one of the conduits 70 or 72 with the pump to receive hydraulic fluid under pressure while simultaneously connecting the other conduit to the reservoir 74. To raise the implement pressure is directed to the conduit 70 and conduit 72 is connected to the reservoir. The conduit 70 extends to and communicates with the rotary flow divider generally 30 and more specifically 82. The rotary flow divider 82 shown in this embodiment is a two rotor device having a first rotor 84 connected to a second rotor 86 by means of a shaft 90. Fluid is supplied to each rotor through the manifold 92 directly connected to the conduit 70. The rotary flow divider will equalize the flow to the left and right side sets of hydraulic cylinders in a well known manner characteristic of the operation of a rotary flow divider. The rotary flow divider 82 divides the flow from the source of hydraulic fluid 76 when the directional control valve is in a first position 94 to the conduits 96 and 100 supplying the respective right 64 and left 62 side hydraulic cylinders. The conduits 96 and 100 connect with the head ends of the right 64 inboard cylinder and the left 62 inboard cylinder. Pressure in the head end of these cylinders will cause the pistons and affixed rods to extend, rotating bell cranks 46 and 50 counterclockwise. As these two cylinders are the master cylinders they will provide hydraulic fluid from the rod ends of the hydraulic cylinders to the head ends of the outboard cylinders 60 and 56 respectively. These outboard cylinders will also rotate their bell cranks 54 and 52 in unison with the inboard bell cranks 46 and 50. Since the wheels 36, 40, 42 and 44 are journalled on the bell cranks 52, 46, 50 and 54 they will engage the ground. The frame sections to which the hydraulic cylinders and bell cranks are pivotally secured will be raised relative to the ground. As the outboard cylinders 60 and 56 are extended fluid expelled from the rod ends thereof will pass through conduits 102 and 104 to conduit 106 which is separated from hydraulic conduit 72 by a solenoid operated valve 110. Hydraulic flow through hydraulic conduit 72 will pass to the reservoir 74 when the directional control valve 80 is in the first position 94. The directional control valve 80 could alternatively be a four position valve with a float position.

In its de-energized position as shown the solenoid valve 110 incorporating position and check valve 112, permits flow only toward conduit 72.

Each master and accompanying slave cylinder, i.e., right outboard cylinder 60 and right inboard cylinder 64 on one end and left inboard cylinder 62 and left outboard cylinder 56 on the other end supplied by conduits 96 and 100 respectively incorporate a counter balance valve such as 114 in conduit 96 hydraulically in parallel with a one-way check valve 116, allowing fluid flow from the rotary flow divider 82 to the right inboard cylinder 64. The counter balance valves 114 and generally 134 provide for smooth and controlled lowering and a rapid raising of the implement. The rapid raise is achieved by the first 116 and second 148 one-way check valves. The controlled lowering is achieved by the counter balance valves such as 114 which are piloted from respective conduits 96 and 100. In order for the counter balance valves to open there must be a positive pressure in conduits 96 and 100 thus there is no cavitation on lowering the implement which will then lower smoothly.

The second counter balance valve generally 134 will operate identically to the first pilot operated relief valve 114.

It should be pointed out that a second one-way check valve 148 is arranged in a hydraulically parallel relationship in line 100 with the second counter balance valve generally 134.

The hydraulic flow diagram shown in FIG. 2 is interfaced with an electrical counter and control system that is contained in the same housing generally speaking as the rotary flow divider generally 30 in FIGS. 1 and 2. The adjustable count selector is an operator controlled element that typically would be located within the operator's work station to enable the operator to change the setting of the element as the machine progresses through the field or is set up prior to its operation. This element is connected to a counter unit 150 that counts the revolutions of the shaft 90 of the rotary flow divider as communicated by electrical lines 152 and 154. The counter unit incorporates a counter logic circuit for producing an electrical signal at a preset count as set in on the adjustable count selector 22. The counter is also connected to a normally open switch 156 interposed in electrical conduit 160 leading to the solenoid operated valve 110. Electrical conduit 162 completes this circuit from the solenoid operated valve back to the counter 150. The normally open switch 156 is actuated through a hydraulic pressure responsive operator 164 that senses hydraulic pressure fluid levels in conduit 100.

In its de-energized position as shown, the solenoid valve 110 positions the check valve 112 in conduit 106/72 which permits flow only toward conduit 72. The pilot operated check valves 132 and 142 permit flow only toward conduits 130 and 104. However, the presence of pressure in conduits 100 or 96 is communicated through pilot lines 126 and 128 to open the check valves either 132 or 142 respectively. When this happens there is a free path for the exhaust of fluid from the rod ends of the cylinders 60 and 56 to the tractor reservoir 74. When the hydraulic cylinders are fully extended the pressure on the head end side will be relieved a certain degree by the orifices 164, 166, 170 and 172, which will serve to allow phasing of the cylinders, but the pressure on the head end side may raise above the normal working pressure. That pressure peak will be communicated through line 164 to the pressure actuated electrical switch 156, which is normally biased open but will close when the pressure exceeds the normal working pressure. When the switch 156 closes the solenoid valve 110 energizes so that fluid may freely flow in either direction through lines 106/72. The conduits 160 and 162 connect with a normally closed switch in counter element 150. The counter unit 150 may be a mechanical counter which counts the number of revolutions made by the shaft 90 of the rotary flow divider 82.

With the implement now in its raised position and the solenoid valve 110 actuated the operator can return the implement to its proper working height by shifting the directional control valve 80 to pressurize conduit 72 and simultaneously connecting conduits 70 to the reservoir 74. Fluid will be directed to the rod ends of the cylinders 60 and 56 and subsequently to the rod ends of cylinders 64 and 62 causing them to contract and thereby lower the implement. As the hydraulic cylinders contract fluid expelled from the head ends of cylinders 64 and 62 will be directed through conduits 96 and 100 eventually to the rotary flow divider 82. As the flow passes through the flow divider 82 the shaft 90 will be rotated. The counter unit 150 will count the revolutions of the shaft 90 and open the normally closed switch in counter element 74 when a predetermined total related to the distance the implement is to be lowered as set by the operator's adjustment of the adjustable count selector 22 in the vehicle operator's work station is attained. When the switch in the counter element opens the solenoid valve 110 is de-energized and shifted to the position in which the check valve 112 blocks flow to the rod end of hydraulic cylinders 60 and 56 while check valves 116 and 144 block return of fluid expelled from the head end of cylinder 64 and 62 to the reservoir. Thus even if conduit 72 continues to be pressurized the implement will be positioned and maintained at a proper height subject only to the operator affecting the setting of the adjustable count selector 22 on the tractor.

The rotary flown divider 82 also performs a function of assuring level lift of the implement by metering the flow to and from the conduits 96 and 100. The function and operation of both the rotary flow divider 82 and the re-phasing valves or differential relief valves 144 and 146 are explained in patent application Ser. No. 156,890, now U.S. Pat. No. 4,335,894 by W. C. Swanson for "Implement Level Lift System With Re-phasing Valves" which application has an assignee common herewith.

Pilot lines 124 and 136 function as a thermorelief by opening the counter balance valves 114 and 134 whenever expansion of fluid, for instance from the heat of the sun, causes a pressure rise in the cylinders 56, 60, 62 and 64. With these valves open the expanded fluid from the rams may be dispensed to the rubber conduit hoses.

While a single embodiment of the present invention has been shown and described herein it will be appreciated that various changes and modifications may be made without departing from the spirit of the invention as defined by the scope of the appended claims. Substitutions of equipment in the embodiment not critical to the invention are contemplated by the inventor. For instance it is expected that the disk harrow implement shown could be replaced by other types of tillage equipment or trail behind implements while benefiting from the advantages of this invention.

What is claimed is:

1. In an agricultural machine including a tractor vehicle providing a source of hydraulic fluid and a trail behind implement supported on a plurality of hydraulically pivoted mounted wheels an implement height selector control comprising:

a directional control valve in said tractor vehicle interposed between said source of hydraulic fluid and said trail behind implement;

a rotory flow divider having a shaft connecting a plurality of rotors, said rotary flow divider hydraulically connected with said source of hydraulic fluid;

a plurality of hydraulic motors downstream of said rotary flow divider communicating hydraulically through hydraulic conduit with said source of hydraulic fluid through said rotary flow divider, said plurality of hydraulic motors including sets of hydraulic motors corresponding to the number of rotary flow divider rotors;

a revolution counter generator having a counter logic circuit incorporated in said rotary flow divider for counting revolutions of said shaft of said rotary flow divider;

an adjustable count selector located in said tractor vehicle communicating electrically with said revolution counter generator for determining the value at which said counter logic circuit of said revolution counter generator will produce an electrical signal;

a solenoid operated check valve in a second hydraulic conduit electrically communicating with said revolution counter generator operatively responsive to hydraulic pressure on said hydraulic motor side of said rotary flow divider through a normally open switch;

a plurality of counter balance valves, one of each of said counter balance valves interposed in said hydraulic conduit between one of each of said plurality of rotors of said rotary flow divider and each set of said plurality of hydraulic motors, said counter balance valves communicating hydraulically through pilot lines to said second hydraulic conduit, said counter balance valves set to open either through pressure in said hydraulic conduit or said second hydraulic conduit;

a plurality of one-way check valves, one of each of said one-way check valves interposed in said hydraulic conduit between one of each of said pluralities of rotors of said rotary flow divider and each set of said plurality of hydraulic motors, said one-way check valve allowing flow from said rotary flow divider to said hydraulic motors;

a plurality of one-way pilot operated check valves, one of each of said one-way pilot operated check valves associated with one of each of said sets of hydraulic motors, interposed in said second hydraulic conduit and pilot operated to open allowing fluid to pass from said hydraulic motors through said second hydraulic conduit.

2. The invention in accordance with claim 1 wherein said sets of hydraulic motors are hydraulic cylinders hydraulically connected in a master/slave relationship wherein a master hydraulic cylinder receives fluid through said hydraulic conduit and a slave hydraulic cylinder delivers fluid to said second hydraulic conduit.

3. The invention in accordance with claim 2 wherein said rotary flow divider has two rotors, four hydraulic motors arranged in sets of two master/slave systems, two counter balance valves, two one-way check valves and two pilot operated one-way check valves.

4. The invention in accordance with claim 2 wherein said solenoid operated check valve is operatively responsive to hydraulic pressure in said hydraulic conduit.

5. In an agricultural machine including a tractor vehicle providing a source of hydraulic fluid and a trail behind implement supported on a plurality of hydraulically pivoted mounted wheels an implement height selector control comprising:

a multiposition control valve mounted in said tractor vehicle communicating with said source of hydraulic fluid;

a hydraulic communications system including a first conduit (70), a second conduit (102, 106, 72), third and fourth conduits (96 and 100) all communicating with said source of hydraulic fluid subject to the position of said multiposition control valve;

a rotary flow divider having a shaft connecting a pair of rotors, said rotary flow divider hydraulically communicating with said first, third and fourth conduits;

a plurality of hydraulic motors arranged as two sets of two master/slave hydraulic cylinders, said master cylinders connected to respective third and fourth conduits and said slave cylinders connected to said second conduit;

a revolution count generator having a counter logic circuit incorporated in said rotary flow divider for counting revolutions of said shaft of said rotary flow divider;

an adjustable count selector located in said tractor vehicle communicating electrically with said revolution count generator for determining the value at which said counter logic circuit will tally an electrical signal;

a solenoid operated check valve in said second hydraulic conduit electrically communicating with said revolution count generator operatively responsive to hydraulic pressure in said fourth conduit and the electrical signal of said revolution count generator counter logic circuit;

a pair of counter balance valves, one of each of said valves interposed in parallel with each respective third and fourth conduits between said rotary flow divider and said hydraulic motors, said counter balance valves communicating hydraulically through pilot lines to said second hydraulic conduit, said counter balance valves set to open either through pressure in said hydraulic conduit or said second hydraulic conduit, said counter balance valves incorporating a one-way check valve preventing fluid flow from said hydraulic motors to said rotary flow divider when said counter balance valve is closed;

a pair of one-way pilot operated check valves, one of each of said one-way pilot operated check valves associated with one of each of said sets of hydraulic cylinders interposed in said second hydraulic conduit and pilot operated to open when hydraulic pressure in said first circuit exceeds pressure in said hydraulic motor set to allow fluid to pass from said hydraulic motors through said second hydraulic conduit.

* * * * *